United States Patent [19]

Kubo et al.

[11] 4,241,622
[45] Dec. 30, 1980

[54] AUTOMATIC TRANSMISSION WITH OVERDRIVE

[75] Inventors: Seitoku Kubo, Sakae; Kojiro Kuramochi, Aichi; Hiroshi Ito, Ima, all of Japan

[73] Assignee: Toyota Jidosha Kogyo Kabushiki Kaisha, Aichi, Japan

[21] Appl. No.: 847,806

[22] Filed: Nov. 2, 1977

[30] Foreign Application Priority Data

Apr. 27, 1977 [JP] Japan ................... 52-47874

[51] Int. Cl.³ ...................... F16H 37/00; F16H 57/02
[52] U.S. Cl. .................... 74/740; 74/606 R
[58] Field of Search .............................. 74/606 R, 740

[56] References Cited

U.S. PATENT DOCUMENTS

| 3,053,115 | 9/1962 | Cartwright et al. | 74/606 R X |
| 3,299,738 | 1/1967 | Sand | 74/606 R |
| 3,382,735 | 5/1968 | Gatiss | 74/606 R X |
| 3,424,034 | 1/1969 | Wickman | 74/781 X |
| 3,613,481 | 10/1971 | Lapinski | 74/606 R X |
| 4,098,143 | 7/1978 | Kubo | 74/740 X |
| 4,152,957 | 5/1979 | Watanabe et al. | 74/606 X |

FOREIGN PATENT DOCUMENTS 908911 10/1962 United Kingdom ................... 74/740

*Primary Examiner*—Leslie Braun
*Attorney, Agent, or Firm*—Toren, McGeady and Stanger

[57] ABSTRACT

An automatic transmission with overdrive, including: a torque converter; a torque converter housing; an oil pump; an overdrive gear mechanism; an overdrive case; an underdrive gear mechanism; a transmission case; and an oil pan. In this automatic transmission, the overdrive gear mechanism is positioned between the torque converter and the underdrive gear mechanism. An exhaust passage is positioned in a lower portion of the overdrive case in side-by-side relationship to an intake passage adapted to introduce oil from the oil pan to the oil pump. As a result, oil is circulated from the oil pump to the hydraulic control device, then to the underdrive gear mechanism and the overdrive gear mechanism and then to the oil pan back to the oil pump.

4 Claims, 5 Drawing Figures

AUTOMATIC TRANSMISSION WITH OVERDRIVE

BACKGROUND OF THE INVENTION

1. Field of the invention

The present invention relates to an automatic transmission for use in an automotive vehicle, and more particularly to an automatic transmission having an overdrive gear mechanism positioned between a hydrokinetic torque converter and an underdrive mechanism.

2. Description of the prior art

As is well known, automatic transmissions for automotive vehicles automatically change gear reduction ratios in response to vehicle speed and load on the vehicle engine. An automatic transmission in general consists of a torque converter and an underdrive gear mechanism which is coupled to the converter and establishes two or more gear reduction ratios of no less than 1. Recently, a demand for an automatic transmission with overdrive has been arisen particularly from the viewpoint of improving the drive feeling to the operator, improving economy and permitting better emmision control of the engine.

In case an overdrive gear mechanism is added to an automatic transmission having a torque converter and an underdrive gear mechanism, when gear strength and capacity of frictional engaging means in the overdrive gear mechanism are desired to be increased for improving durability and manufacturing cost, it is advantageous to position the overdrive gear mechanism between the torque converter and the underdrive gear mechanism rather than on an output side of the underdrive gear mechanism (rear-side type). In other words, an output side of the overdrive gear mechanism is connected to an input side of the underdrive gear mechanism (front side type). In addition, the automatic transmission is equipped with a torque converter and a hydraulic control device, so that an oil pump is required for delivering a hydraulic pressure thereto. The oil pump should be driven by being coupled to an pump impeller in the torque converter, so that in the case of the front side system, the oil pump is provided within a wall partitioning the torque converter from the overdrive gear mechanism. Furthermore, the overdrive case which encompasses the overdrive gear mechanism therewith partitions the overdrive gear mechanism from the underdrive gear mechanism, with the result that the underdrive gear mechanism is housed in a chamber or space which is independent of the underdrive gear mechanism.

During deceleration, respective elements of the overdrive gear mechanism rotate jointly. However, during overdrive, or accleration which occupies a majority of the operating time, respective elements of the overdrive gear mechanism rotate relative to each other for achieving a reduction gear ratio of less than 1. This relative rotation leads to generation of heat as well as development of friction. Thus, oil should be supplied to cool and lubricate the overdrive gear mechanism. However, as has been described earlier, the overdrive gear mechanism is housed in a closed chamber, so that another new oil pan would be necessary under the overdrive gear mechanism in addition to an existing oil pan, thereby discharging oil which has been used for cooling and lubrication, from the overdrive gear mechanism into the aforesaid another oil pan. The addition of such an oil pan is not desirable from the viewpoint of manufacturing cost and saving in weight. Additionally, utilizing a lower inner surface of the overdrive case as an oil sump by increasing the size of the overdrive case is also undesirable.

It is accordingly an object of the present invention to provide an automatic transmission with overdrive of a front-side type, which allows suitable and effective discharge of oil from the overdrive gear mechanism, after cooling and lubrication to an oil pan, for recirculation from the oil pan through an oil pump, a hydraulic control device, and an underdrive gear mechanism and back to the overdrive gear mechanism.

It is another object of the present invention to provide an automatic transmission with overdrive of the type described, which provides means for discharging oil from the overdrive gear mechanism to reduce the weight of the automatic transmission and allow reduction in the size thereof.

SUMMARY OF THE INVENTION

According to the present invention, there is provided an automatic transmission with overdrive, which includes: a hydrokinetic torque converter having an pump impeller, stator vanes, and turbine vanes; a housing accommodating the torque converter therein; an oil pump having an oil pump body positioned adjacent to the torque converter, and an oil pump cover partitioning a pump chamber from the oil pump body; an overdrive gear mechanism positioned adjacent to the torque converter but in coaxial relation thereto, with an input side of the mechanism being coupled to turbine vanes in the torque converter, thereby transmitting a torque from an input side to an output side at a gear reduction ratio of 1 or less than 1; an overdrive case surrounding the overdrive gear mechanism in cooperation with the oil pump cover and having an exhaust passage for lubricating-oil, which passage is communicated with a lower portion of a space accommodating the elements of the overdrive gear mechanism therein; an underdrive gear mechanism positioned adjacent to the overdrive gear mechanism but in coaxial relation to the torque converter, with an input side thereof being coupled to an output side of the overdrive gear mechanism, thereby transmitting a torque from an input side to an output side at two or more gear reduction ratios of no less than 1; a transmission case accommodating elements of the underdrive gear mechanism therein; and an oil pan positioned under the underdrive gear mechanism in communication with the aforesaid exhaust passage, and adapted to store oil therein.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENTS

Figure 1:
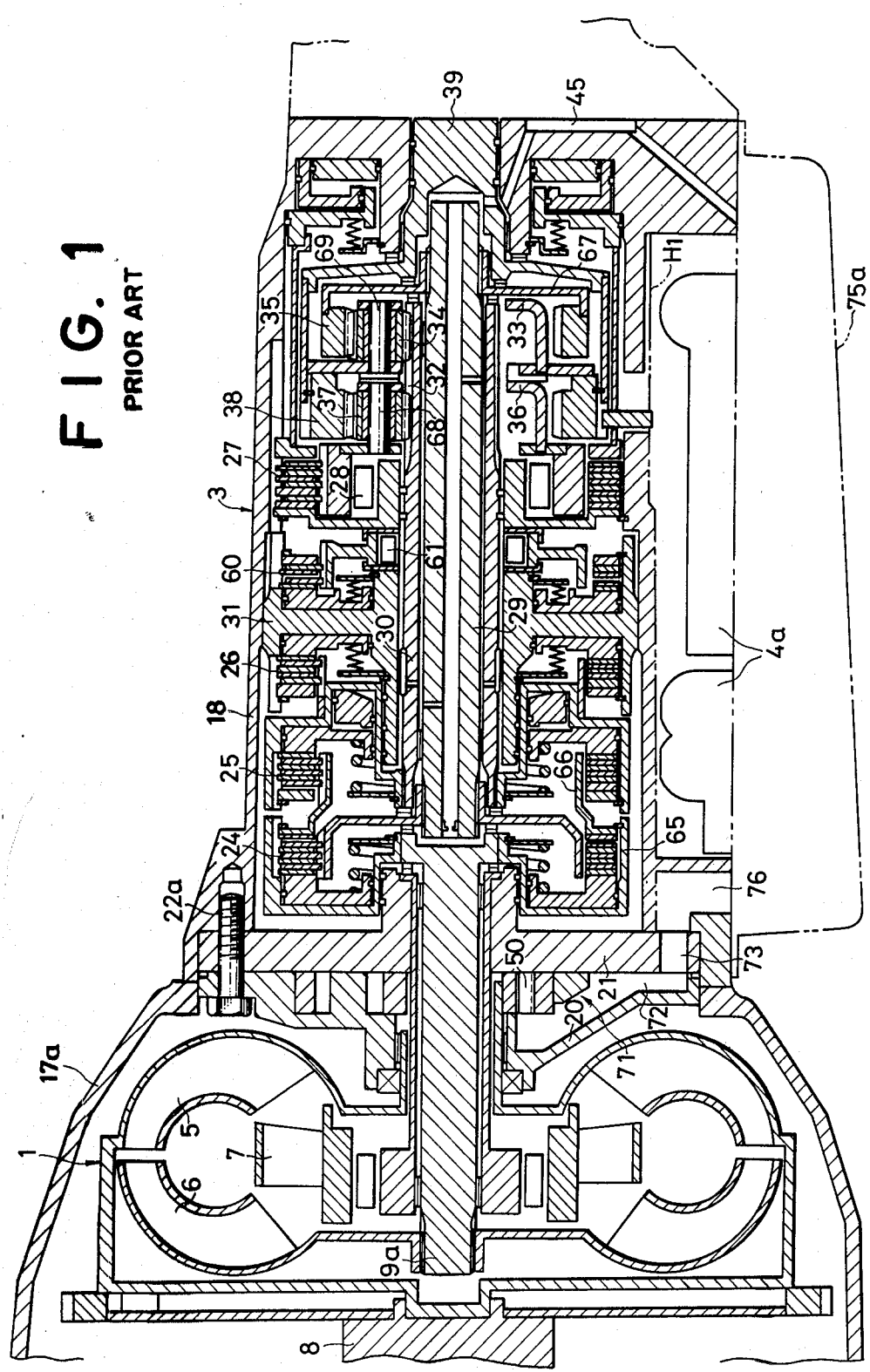
FIG. 1 is a longitudinal cross-sectional view of an automatic transmission which is devoid of an overdrive gear mechanism and of the type which has been produced in a production line.

FIG. 1 shows an automatic transmission of the type which is used in automobiles currently available in the market. A hydrokinetic torque converter 1 includes a pump impeller 5, turbine vanes 6 and stator vanes 7. The pump impeller 5 is coupled to a crank shaft 8 of an engine (not shown), while the turbine vanes 6 are coupled to a turbine shaft 9a. The torque converter 1 is encompassed with a housing 17a in the radial direction thereof. The rear side of torque converter 1 is closed with an oil pump body 20. In this respect, a side closer to the engine is referred to as a "front side", and a side away from the engine is referred to as a "rear side". An oil pump cover 21 is placed adjacent to the oil pump body 20 and defines a pump chamber for accommodating an oil pump 71 therein, in cooperation with the oil pump body 20. An oil pump gear 50 in the oil pump 71 is coupled to the pump impellers 5. A passage 72 defined in the oil pump body 20 is connected to an inlet port for the oil pump 71 as well as to a passage 73 defined in a lower portion of the oil pump cover 21.

Positioned in the rear of the oil pump 71 but adjacent to the oil pump cover 21 in coaxial relation to the torque converter 1 is an underdrive gear mechanism for three forward speed and one reverse speed drive. The turbine shaft 9a serves as an input shaft of the underdrive gear mechanism 3. A front portion of the underdrive gear mechanism 3 is encompassed with the oil pump cover 21 and transmission case 18. The oil pump body 20, oil pump cover 21 and transmission case 18 are fastened together by means of two or more bolts 22a.

The turbine shaft 9a is coupled to a clutch cylinder 65, while a multiple disc clutch 24 is interposed between the clutch cylinder 65 and an intermediate shaft 29. A hub 66 is fitted in the clutch cylinder 65, while a multiple disc clutch 25 is disposed between the hub 66 and a sun gear shaft 30. Positioned between the sun gear shaft 30 and a support 31 secured to the transmission case 18 are a multiple disc brake 26, and a series connection of a one-way clutch 61 and a multiple disc brake 60. The sun gear shaft 30 is formed with a sun gear 32. The sun gear 32 meshes with planetary pinions 34 and 37, while one of planetary pinion 37 meshes with a ring gear 35, and the other of planetary pinion 34 meshes with a ring gear 38. In other words, there are provided two-row planetary gear units consisting of a combination of sun gear 32, planetary pinion 34 and ring gear 35 and another combination of sun gear 32, planetary pinion 37 and ring gear 38. The ring gear 35 is coupled through the medium of a flange 67 to the intermediate shaft 29. The planetary pinion 34 is rotatably supported on a pinion shaft 69, while the planetary pinion 37 is rotatably supported on a pinion shaft 68 mounted on a carrier 36. An output shaft 39 of the underdrive gear mechanism 3 is coupled to the ring gear 38 and carrier 33. Provided between a carrier 36 and transmission case 18 are a multiple disc brake 27 and a one-way clutch 28.

A lower side of the underdrive gear mechanism is covered with an oil pan 75a. The oil pan 75a accommodates therein a hydraulic control device 4a (partially shown) adapted to control a hydraulic pressure to be delivered to a hydraulic servo (cylinder) for the underdrive gear mechanism. A passage 76 formed under the front end of transmission case 18 connects an oil passage 73 provided in the oil pump cover 21 to the interior of oil pan 75a.

In addition to the oil passage 73, the oil pump cover 21 is provided with an oil passage connecting a hydraulic control device 4a to the clutch cylinder 65, and another oil passage connecting a discharge port of the oil pump 71 to the hydraulic control device 4a. In addition, an oil passage for delivering oil from the hydraulic control device 4a to the torque converter 1, and an oil passage for returning oil from the torque converter 1 to the hydraulic control device 4a are formed in the oil pump body 20 and oil pump cover 21.

A level H1 as shown in FIG. 1 represents the height or level of oil during normal cruising of the motor vehicle.

Figure 2:
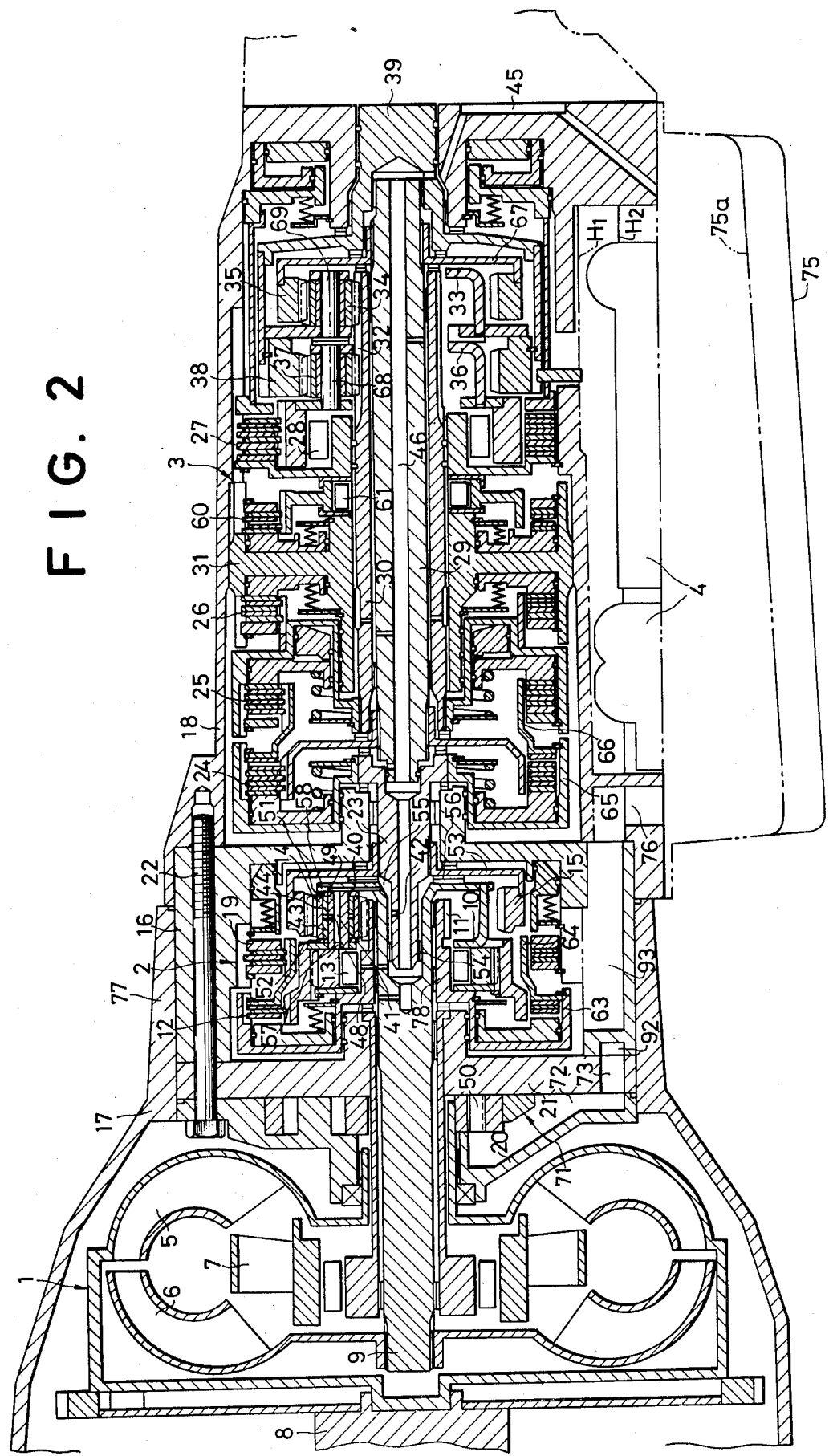
FIG. 2 is a longitudinal cross-sectional view of one embodiment of the automatic transmission with overdrive according to the present invention.

FIG. 2 is a longitudinal cross-sectional view of an automatic transmission having an overdrive gear mechanism 2 according to the present invention. Like parts are designated with like reference numerals in common with those given in FIG. 1.

The turbine shaft 9 serves as an output shaft for the torque converter 1, as well as an input shaft for the overdrive gear mechanism, being coupled to the carrier 10 for a planetary gear unit in the overdrive gear mechanism. The carrier 10 is formed with a pinion shaft 49, while needle bearings 43, 44 are fitted on the pinion shaft 49 in two rows. The planetary pinion 14 is rotatably supported by the pinion shaft 49 through the medium of needle bearing 43, 44, and meshes with the sun gear 11 and ring gear 15. Thrust washers 51, 52 are provided between the planetary pinion 14 and the carrier 10 on the opposite sides, respectively. The sun gear shaft 78 carrying the sun gear 11 thereon is coupled to a clutch cylinder 63. A hub 64 is splined to the clutch cylinder 63. A multiple disc clutch 12 is positioned between the clutch cylinder 63 and the carrier 10, while a one-way clutch 13 is provided between the sun gear shaft 78 and the carrier 10. A multiple disc brake 19 is provided between the hub 64 and the overdrive case 16 accommodating the overdrive gear mechanism therein. The housing 17 encompasses the torque converter 1, and is formed with an extension portion 77 having a cylindrical inner surface. The overdrive case 16 has an cylindrical wall fitted in the inner cylindrical surface of the extension portion 77. A flange 53 is coupled to the ring gear 15 and splined to an input shaft 23 of the underdrive gear mechanism 3. The input shaft 23 is positioned in coaxial relation to the turbine shaft 9 and coupled to the clutch cylinder 65 in the underdrive gear mechanism 3. A bearing 54 is interposed between the turbine shaft 9 and the input 23, while a washer 56 is positioned between the carrier 10 and the flange 53. The oil pump body 20, oil pump 21, overdrive case 16 and transmission case 18 are fastened together by means of two or more bolts 22.

The relationship between change-gear positions and operations of respective clutches and brakes in the automatic transmission thus arranged are shown in the following Table 1.

TABLE 1

| shift position | 12 | 24 | 25 | 19 | 26 | 27 | 13 | 28 | 61 | 60 |
|---|---|---|---|---|---|---|---|---|---|---|
| P | | O | X | X | X | O | / | / | / | X |

TABLE 1-continued

|   |            |   |   |   |   |   |   |    |    |    |   |
|---|------------|---|---|---|---|---|---|----|----|----|---|
|   | R          | O | X | O | X | X | O | RC | RC | OR | X |
|   | N          | O | X | X | X | X | X | /  | /  | /  | X |
| D | 1st        |   |   |   |   |   |   |    |    | *  |   |
|   | speed drive 2nd | O | O | X | X | X | X | RC | RC | RC | X |
|   | speed drive 3rd | O | O | X | X | O | X | RC | OR | RC | O |
|   | speed drive OD | O | O | O | X | X | X | RC | OR | OR | O |
|   | OD         | X | O | O | O | X | X | OR | OR | OR | O |
| 2 | 1st        |   |   |   |   |   |   |    |    | *  |   |
|   | Speed drive 2nd | O | O | X | X | X | X | RC | RC | RC | X |
|   | speed drive | O | O | X | X | O | X | RC | OR | RC | O |
|   | L          | O | O | X | X | X | O | RC | RC | OR | X |

In Table 1, the reference characters and symbols shown therein are designated as follows:
P. parking range
R. reverse range
N. neutral range
D. drive range
2. second range
L. low range
O. engaged condition
X. released condition
RC. locked condition
OR. overrun condition
*. torque is not transmitted In the lubrication and cooling of respective components constituting the overdrive gear mechanism 2 and underdrive gear mechanism 3, oil which has been pressurized by the oil pump 71 is adjusted to a given pressure level by the hydraulic control device 4. The oil thus adjusted is delivered via oil passage 45 in the transmission case 18 and an oil passage in the intermediate shaft 29 to respective components of the overdrive gear mechanism 2 and underdrive gear mechanism 3 for lubrication and cooling. Specific oil passage means is provided in the overdrive gear mechanism 2 for lubricating and cooling the neighborhood of the needle bearings 43, 44. In other words, an oil chamber 55 is defined by the input shaft 23 and turbine shaft 9 therebetween. The oil chamber 55 is communicated with an inner bore provided in the input shaft 23 via a hole 42 provided in the wall of the input shaft 23. Oil passage 40 runs in the radial direction of the carrier 10 and is communicated with the oil chamber 55 at one end thereof, and blocked with a plug 58 at the other end. An oil passage 40 runs through the pinion shaft 49 in the axial direction. The oil passage 41 is connected to the oil passage 40 at one end thereof and blocked with a plug 57 at the other end. Midway of the pinion shaft 49 as viewed in the axial direction, there is provided an oil passage 48 which is connected to the oil passage 41 at one end and terminates between the needle bearings 43, 44. Respective elements in the neighborhood of the needle bearings 43, 44 are lubricated and cooled with oil of a given pressure, which is supplied through hole 42, oil chamber 55 and oil passages 40, 41, 48.

Figure 3:
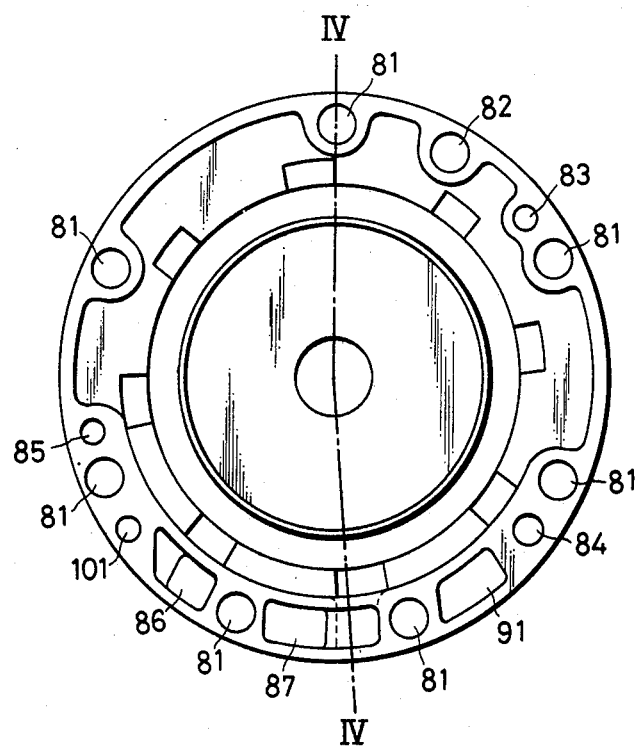
FIG. 3 is a left-hand side view of an overdrive case.
Figure 4:
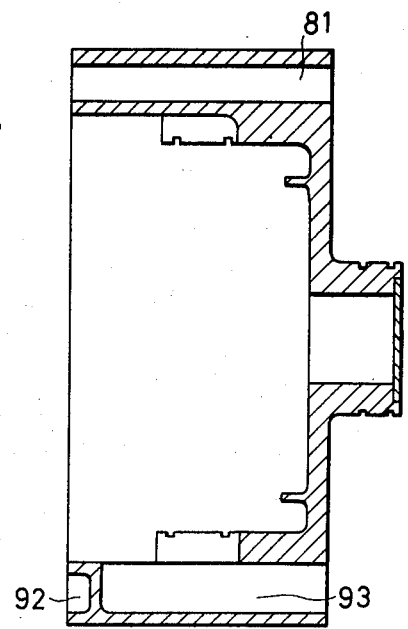
FIG. 4 is a cross-sectional view of the overdrive case taken along the line IV—IV of FIG. 3.
Figure 5:
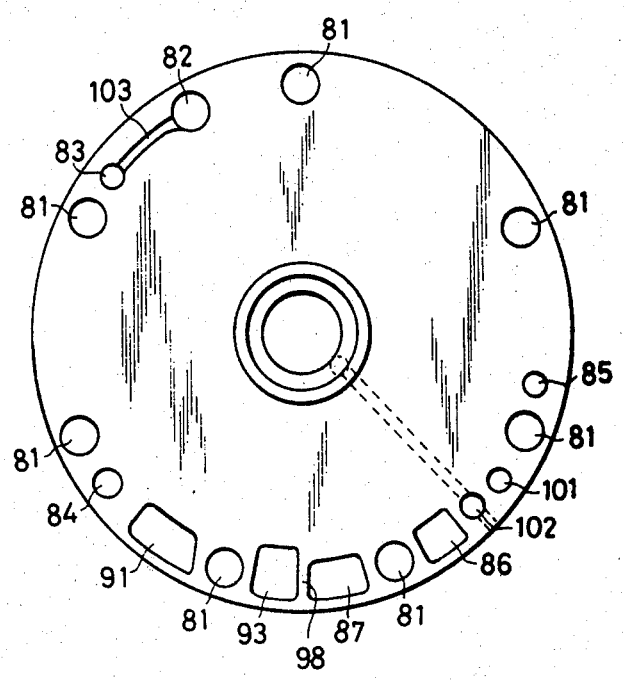
FIG. 5 is a right-hand side view of the overdrive case.

FIG. 3 shows the left-hand side view of the overdrive case 16, on the side of the torque converter 1. FIG. 4 is a cross-sectional view taken along the line IV—IV FIG. 3. FIG. 5 is a right-hand side view of the overdrive case 16, on the side of underdrive gear mechanism. The vertical direction shown in FIGS. 3 and 5 corresponds to the direction normal to the ground, while the left-hand side thereof corresponds to the side of the torque converter, and the right-hand side thereof corresponds to the side of underdrive gear mechanism 3. A hole 81 has a bolt 22 extending therethrough. A breather passage 82 is provided in the underdrive gear mechanism and connects a breather port (not shown) to a hole in the oil pump body 20. An oil return passage 83 is provided under the breather passage 82 for preventing leakage of oil from the breather port in the underdrive gear mechanism 3. The breather passage 82 is communicated with the oil return passage 83 via groove 103 provided in the end surface of the overdrive case 16 on the side of the underdrive gear mechanism 3. In this manner, oil within the breather passage 82 is returned along the oil return passage 83, without leaking from the breather port. A supply passage 84 is provided for supplying oil from the hydraulic control device 4 to the torque converter 1. An exhaust passage 85 is provided for returning oil from the torque converter 1 to the hydraulic control device 4. Intake passages 86, 87 are for introducing oil from the oil pan 75 positioned under the underdrive gear mechanism 3 to the pump 71. A discharge passage 91 is provided for introducing oil pressurized by the oil pump 71 to the hydraulic control device 4 positioned under the underdrive gear mechanism 3. The intake passage 87 is connected to an oil passage 73 in the oil pump cover 21 at the front end of the passage 87, and connected to an oil passage (not shown) positioned in side-by-side relation to the oil passage 76 through the medium of a wall at the rear end of the passage 87. The intake passage 87 is positioned in the lowermost portion of the overdrive case for connection with the oil passage 73, and formed with an enlarged portion 92 at the front end of the passage 87. The exhaust passage 93 is formed in the lowermost portion of the periphery of the overdrive case 16 in side-by-side relation to the intake passage 87 and communicated with a lower portion of a space within the overdrive case 16, while being connected to the oil pan 75 at the rear end of the passage 93. The intake passage 87 and the exhaust passage 93 is partitioned by a wall 98. A passage 101 connects the hydraulic control device 4 to the multiple disc clutch 12 for introducing a hydraulic pressure to the latter. A passage 102 connects the hydraulic control device 4 to the clutch cylinder 65 for introducing a hydraulic pressure thereto. Passages 82, 83, 84, 85, 86, 87, 91, 101 run through a peripheral portion of the overdrive case 16 in the axial direction.

The oil which has lubricated and cooled respective components in the overdrive gear mechanism 2 is then returned via return passage 93 to oil pan 75. To this end, the level of oil under the underdrive gear mechanism is lowered from H1 to H2. The level H2 is so set as to be lower than the position of return passage 93. The oil pan 75 having a deeper depth than that of the oil pan 75a is used for accommodating oil of an optimum amount, with the oil level being maintained lowered to the level H2. Alternatively, this may be attained by simply lowering an attaching position of the oil pan 75a to the transmission case 18, without modifying the oil pan 75a.

According to the automatic transmission which includes the overdrive gear mechanism 2 between the torque converter 1 and the underdrive gear mechanism 3, oil contained in a closed space within the overdrive gear mechanism may be returned through an exhaust passage 93 to the oil pan 75 positioned under the underdrive gear mechanism 3, the aforesaid passage 93 being formed in the lower portion of the overdrive case 16. Accordingly, this dispenses with the provision of an additional oil pan under the overdrive gear mechanism 2. In addition, this eliminates the need to provide an oil sump or pan by enlarging the size of overdrive case 16 in the radial direction. As a result, weight saving and reduction in size may be successfully achieved for an automatic transmission.

While a specific embodiment of the invention has been shown and described in detail to illustrate the application of the inventive principles, it will be understood that the invention may be embodied otherwise without departing from such principles.

What is claimed is:

1. An automatic transmission with overdrive comprising a hydrokinetic torque converter including a housing having said torque converter operatively accommodated therein; an overdrive gear mechanism having an input side and an output side positioned adjacent said torque converter in coaxial relationship therewith, said input side being coupled with said torque converter, said overdrive mechanism including gear means operating to transmit torque from said input side to said output side at a gear reduction ratio not greater than 1; oil pump means including an oil pump and an oil pump cover member located adjacent said torque converter between said torque converter and said overdrive gear mechanism; an overdrive casing housing said overdrive gear mechanism therein, said overdrive casing and said oil pump means being relatively positioned such that said oil pump cover serves to house said oil pump and also to simultaneously cooperate with said overdrive casing to form part of the housing for said overdrive gear mechanism; an underdrive gear mechanism positioned adjacent said overdrive gear mechanism on the side thereof opposite said torque converter and arranged in coaxial relationship with said torque converter, said underdrive gear mechanism having an input side and an output side with said input side coupled with said output side of said overdrive gear mechanism, said underdrive gear mechanism including gear means operating to transmit torque from said input side to said output side at a plurality of gear reduction ratios not less than 1; a transmission casing housing said underdrive gear mechanism therein; oil pan means located beneath said underdrive gear mechanism for supplying lubricating oil; oil passage means for transmitting lubricating oil to and from said oil pan means, said oil passage means including an oil exhaust passage defined to extend through a lower portion of said overdrive casing and being in direct flow communication with said oil pan means for returning lubricating oil thereto; an outer peripheral face defined on the exterior of said overdrive casing; and inner peripheral faces defined on each of said transmission casing and said torque converter housing; said transmission being arranged with said overdrive casing mounted partially within both of said torque converter housing and said transmission casing, with said inner peripheral faces of said transmission casing and said torque converter housing each having fitted therein respective portions of said outer face of said overdrive casing.

2. An automatic transmission with overdrive, as set forth in claim 1, wherein said exhaust passage is positioned in a lower portion of said overdrive case in side-by-side relation to an intake passage for introducing oil from said oil pump.

3. An automatic transmission with overdrive, as set forth in claim 2, wherein the level of oil contained in said oil pan is set to be lower than said exhaust passage provided in said overdrive case.

4. An automatic transmission with overdrive, as set forth in claim 1, wherein said transmission further includes a breather passage, an oil return passage for preventing the leakage of oil from a breather port, an oil supply passage for supplying oil from a hydraulic control device to said torque converter, an exhaust passage for returning oil from said torque converter to said hydraulic control device, an intake passage for introducing oil from said pan to said oil pump, a discharge passage for introducing oil pressurized by said oil pump, to said hydraulic control device and a passage for connecting said hydraulic control device to a multiple disc clutch, all of which run through a peripheral portion of said overdrive case if traversing relation.

* * * * *